Figure 1:
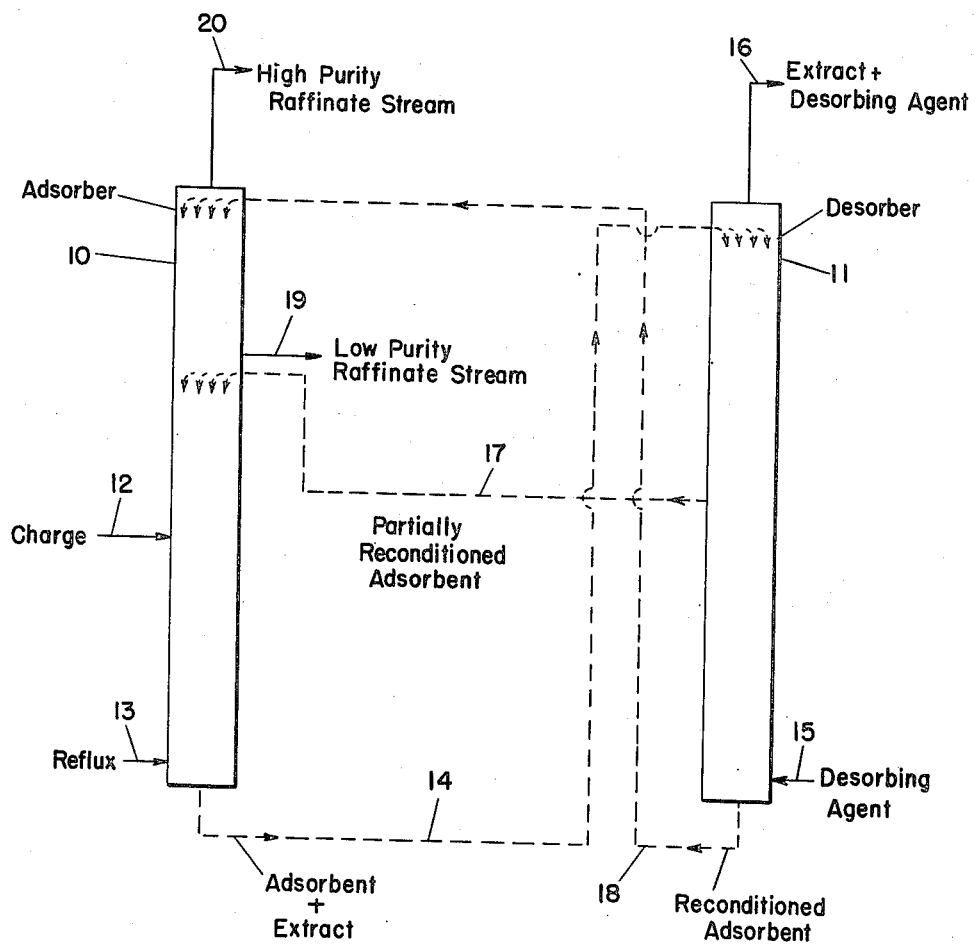

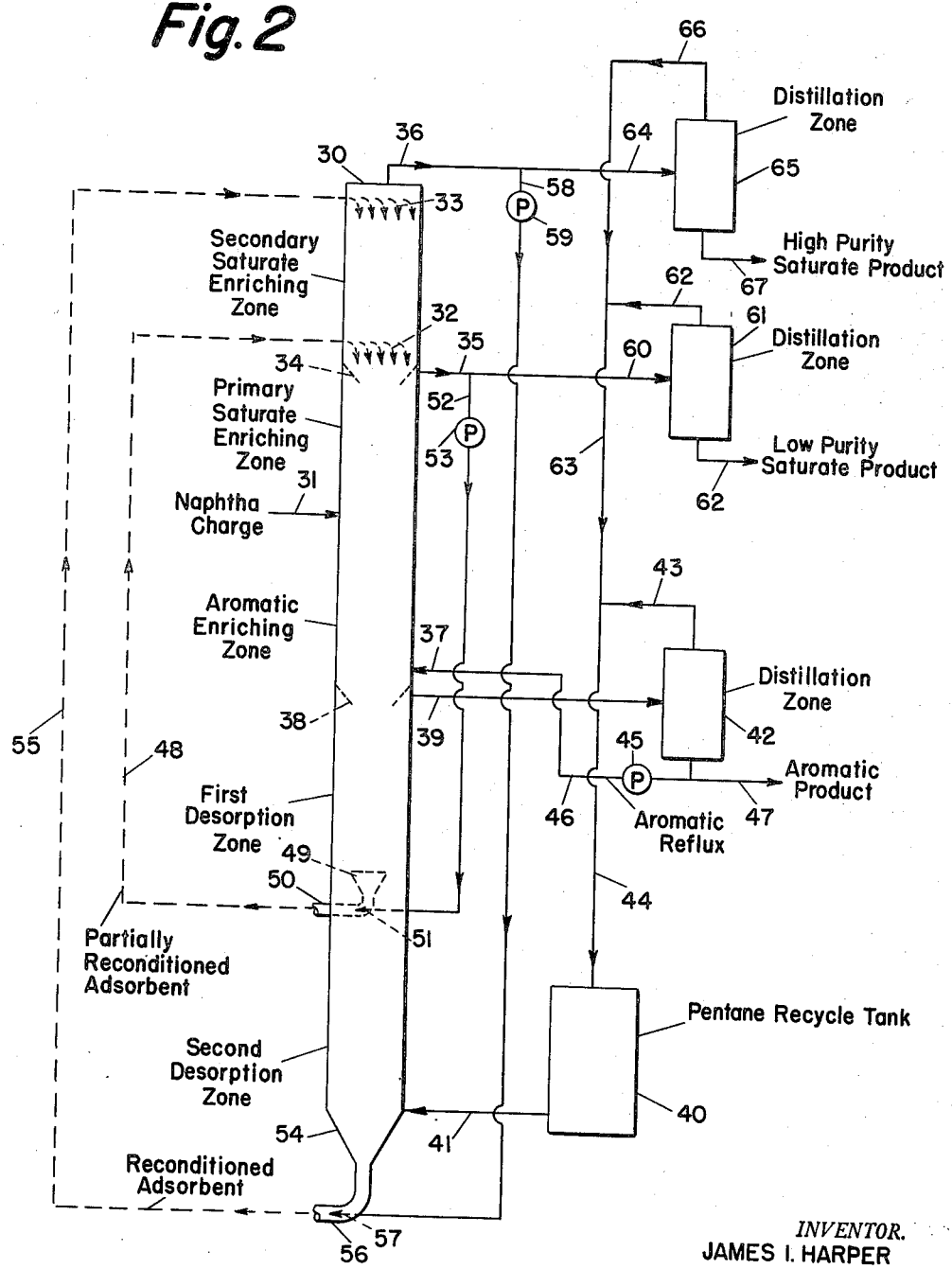

Patented June 30, 1953

2,644,018

UNITED STATES PATENT OFFICE 2,644,018

CONTINUOUS ADSORPTION PROCESS

James I. Harper, Media, Pa., assignor to Sun Oil Company, Philadelphia, Pa., a corporation of New Jersey Application December 16, 1949, Serial No. 133,316

14 Claims. (Cl. 260—674)

This invention relates to the separation of organic compounds by selective adsorption. More particularly the invention relates to a continuous adsorption process involving treatment of a liquid organic charge mixture with a selective adsorbent followed by treatment of the used adsorbent with a liquid desorbing agent to recondition it for re-use. The invention has particular utility in the separation of hydrocarbons having different degrees of saturation.

The separation of liquid organic compounds of different absorbabilities by means of selective adsorbents is well known, and various continuous processes for effecting such separations have been proposed heretofore. One manner of continuous operation involves the passage of a selective adsorbent through an adsorption zone countercurrent to the liquid charge, after which the used adsorbent is sent through a desorption zone countercurrent to a suitable liquid desorbing agent. In the adsorption step one or more of the charge components is selectively removed as an adsorbate or extract phase, thus yielding a raffinate phase which is enriched with respect to one or more of the less adsorbable charge components. In the desorption step the desorbing agent displaces the extract phase from the adsorbent, so that the extract is obtained in admixture with excess desorbing agent from which it may be separated by distillation. Reconditioned adsorbent, carrying that part of the desorbing agent which has displaced the extract, may, when the desorbing agent is not itself too strongly adsorbed, be returned directly to the adsorption zone for re-use. Desorbing agent thus carried into the desorption zone will in turn be largely displaced from the adsorbent by the charge components and will issue from the adsorption zone mainly in admixture with the raffinate stream.

In a continuous process of the type above described, the adsorbent may be passed through the adsorption and desorption zones either in the form of moving beds or as dispersed particles falling countercurrently through the liquids which are being contacted. Continuous processes embodying such procedures have been described and claimed in Olsen applications Serial No. 84,590, filed March 31, 1949, now Patent No. 2,585,490, and Serial No. 90,108, filed April 28, 1949, now Patent No. 2,564,717; and in Ockert applications Serial No. 102,275, filed June 30, 1949, now Patent No. 2,614,133, and Serial Nos. 111,111, 111,112, 111,113, 111,114 and 111,115, filed August 19, 1949. While these processes are capable of effecting separation of many kinds of liquid organic mixtures which are composed of compounds having different adsorbabilities, they have special utility in the separation of hydrocarbons of differing degrees of saturation, such as in removing aromatics from saturates, olefins from saturates or aromatics from olefins. For such purposes silica gel and activated carbon are particularly effective adsorbents, although various other adsorbents are known to be useful. Silica gel and activated carbon are also good adsorbents for making many other types of separations where the charge is composed of various non-hydrocarbon organic compounds such as oxygenated, halogenated or nitrogen-containing derivatives of hydrocarbons and the like.

The present invention is directed to an improvement in processes of the foregoing kind and will be described, for purpose of illustration, with particular reference to the separation of aromatic from saturate hydrocarbons employing silica gel as the adsorbent. The resolution of petroleum fractions, such as naphtha, kerosene, gas oil and lubricating oil, into aromatic-lean and aromatic-rich products is exemplary of this type of separation.

When a petroleum fraction is treated in an efficient adsorption process to separate the aromatic from the saturate hydrocarbons, the amount of saturate product obtained usually will be considerably in excess of the amount of aromatic product. This is due to the fact that, as a general rule, petroleum fractions used as starting material are composed of a major amount of saturate components and a minor amount of aromatics. It is often the case, however, that the available market for high purity saturate product is sufficiently limited that a considerable excess will be produced in obtaining the amount of high purity aromatic product required to meet market demands. In such case only a portion of the high purity saturate product will be salable as a special product and the remainder generally will have to be disposed of unprofitably, such as by blending into gasoline, fuel oil or the like. It is therefore desirable that the separation process employed be capable of operation in such manner as to yield only the quantity of high purity saturate product needed for filling market requirements while still yielding the desired amount of high purity aromatic product.

The present invention provides a continuous adsorption process in which the foregoing result can be achieved with attendant reduction in operating costs. The process is carried out in a fashion so as to yield two raffinate products, one of relatively low purity and the other of relatively high purity. In the desorption step the adsorbent is treated in such manner that a portion of it is only partially reconditioned before re-use in the adsorption step, while the remainder is more fully reconditioned prior to being returned for re-use. This permits the desorption step to be conducted with reduced quantities of desorbing agent and results in a corresponding reduction in operating costs.

The process, as applied to the separation of aromatic and saturate hydrocarbons, comprises countercurrently treating liquid charge with the adsorbent in an adsorption zone to selectively adsorb aromatics and then countercurrently treating the used adsorbent with a suitable liquid desorbing agent in a desorption zone. A portion of the adsorbent in partially reconditioned form is withdrawn from the desorption zone intermediate its ends and is returned to the adsorption zone at a locus downstream, with respect to the direction of charge flow, from the locus of charge introduction. The remainder of the adsorbent in more fully reconditioned form is withdrawn adjacent an end of the desorption zone and is returned to the adsorption zone at a locus still farther downstream from the locus of charge introduction. Two raffinate or saturate-rich streams are obtained from the adsorption zone, one of low purity which is withdrawn adjacent the locus at which partially reconditioned adsorbent is introduced and the other of high purity which is withdrawn adjacent the locus of introduction of more fully reconditioned adsorbent. The extract or aromatic-rich product is obtained from the desorption zone in admixture with desorbing agent.

The invention will be more fully described with reference to the accompanying drawings in which:

Fig. 1 is a simplified schematic diagram illustrating the invention; and Fig. 2 is a schematic diagram illustrating in more detail one embodiment of the process in which a single column is utilized for conducting the adsorption and desorption steps.

Referring first to Fig. 1, two separate columns are illustrated, column 10 constituting the adsorption zone and column 11 the desorption zone. Charge material enters column 10 in liquid phase at an intermediate level through line 12 and flows upwardly countercurrent to descending adsorbent. As previously stated the adsorbent may move through the column either in the form of a moving bed or as showering particles falling countercurrent to the charge material. Contact between the adsorbent and charge causes the more adsorbable charge component to be extracted and carried with the adsorbent toward the bottom of column 10. To improve the separation, reflux comprising a portion of the extract product from the operation may be introduced into the lower part of column 10 through line 13. The use of reflux in this manner increases the purity of the extract component and is analogous to the use of reflux in distillation. That portion of column 10 between lines 12 and 13 thus constitutes an enriching zone for the more adsorbable charge component.

Used adsorbent, carrying the extracted component in adsorbed phase, is removed from the bottom of column 10 and is sent to the upper part of column 11 as indicated by dotted line 14. Various ways of transporting the adsorbent are known, such as by means of screw conveyors or bucket elevators or by employing a transporting liquid in which the adsorbent is carried as a dispersion; and it will be understood that the present invention does not necessarily depend upon the particular manner selected for transporting the adsorbent from one zone to the other.

The used adsorbent after introduction into column 11 passes downwardly, either as a moving bed or as falling particles, countercurrent to a stream of liquid desorbing agent which is admitted to column 11 near the bottom through line 15. The purpose of the desorbing agent is to displace extract from the adsorbent and to carry it out of column 11 at the top through line 16 as a solution of extract in excess desorbing agent. However, at an intermediate level in the column a portion of the adsorbent, from which only a part of the extract has been removed and which therefore is in a state that may be referred to as only partially reconditioned, is withdrawn and sent back to adsorption column 10 as indicated by dotted line 17. The remainder of the adsorbent passes downwardly through the lower part of column 11 where it contacts the fresh desorbing agent admitted near the bottom and thus is more fully reconditioned for re-use. The latter portion is then returned from the bottom of column 11, as indicated by dotted line 18, to column 10 and is therein introduced near the top. Desorber column 11 thus in effect comprises two different zones, the upper part being a first desorption zone and the lower part a second desorption zone. Due to the withdrawal of a portion of the adsorbent through line 17 at the bottom of the first desorption zone, the ratio of desorbing agent to adsorbent in the second desorption zone is higher than in the first. This facilitates displacement of extract in that part of the column where it is most difficult to desorb due to its relatively low concentration in the adsorbed phase.

From adsorber column 10 one raffinate stream is withdrawn through line 19 near the locus at which the partially reconditioned adsorbent is returned. This stream contains raffinate product of relatively low purity, since it has been in contact with adsorbent carrying a substantial amount of the extract component. It also contains some desorbing agent which was displaced from the partially reconditioned adsorbent and therefore should be sent to a distillation zone (not shown) for separation of desorbing agent from the low purity raffinate product.

From the top of column 10 another raffinate stream is removed through line 20. Since this material has been in contact with more fully reconditioned adsorbent, it contains raffinate product of relatively high purity. It also contains some desorbing agent which has been displaced from the more fully reconditioned adsorbent and should likewise be subjected to distillation for removal of the desorbent.

From the foregoing description it may be seen that column 10 in effect comprises, in addition to the aromatic enriching zone previously mentioned, two other zones which are above the charge inlet, namely, a primary saturate enriching zone immediately above it and a secondary saturate enriching zone above the inlet for partially reconditioned adsorbent. In the latter zone only the more fully reconditioned adsorbent is utilized, whereas both portions of returned adsorbent pass through the primary saturate enriching zone.

Fig. 2 schematically illustrates another manner of practicing the process and will be described with particular reference to the treatment of a charge mixture composed of aromatic and saturate hydrocarbons, for example a naphtha fraction having a boiling rang of 300–400° F., utilizing silica gel as the adsorbent. For purpose of discussion the desorbing agent will be considered to be pentane; but it is to be understood that numerous other organic liquids will serve as the desorbent, as hereinafter more fully discussed.

Referring to Fig. 2 numeral 30 indicates a single elongated column which is adapted for carrying out the entire adsorption and desorption operations. The column may be considered as composed of five different zones positioned in the following order going from top to bottom of the column: a secondary saturate enriching zone, a primary saturate enriching zone, an aromatic enriching zone, a first desorption zone and a second desorption zone. The operation is conducted in such manner that the adsorbent passes from the upper part of the column toward the bottom in the form of particles falling or showering through the liquids being contacted rather than as a moving bed or compact mass.

The naphtha charge enters the column through line 31 at the junction of the primary saturate enriching zone and the aromatic enriching zone and flows upwardly countercurrent to the falling silica gel. Partially reconditioned silica gel is introduced into the column at the junction of the primary and secondary saturate enriching zones and immediately falls downwardly as indicated by arrows at 32. More fully reconditioned silica gel enters the column near the top where it immediately begins to fall downwardly as indicated by arrows at 33. Contact of the upflowing naphtha with the descending silica gel causes a transfer of the aromatic constituents of the charge from liquid phase to adsorbed phase, so that the liquid becomes progressively enriched with respect to charge saturates as it progresses toward the top of the column. At the junction of the primary and secondary saturate enriching zones column 30 is provided with suitable means for causing separation of silica gel particles from the liquid. Such means are shown in Fig. 2 in the form of a conical baffle 34 through which the particles must pass to enter the primary saturate enriching zone. The space between baffle 34 and the wall of column 30 thus provides a zone in which particle-free raffinate phase accumulates and from which a stream comprising low purity raffinate is withdrawn by means of line 35. In place of a conical baffle any other suitable means for disengaging the silica gel particles from the raffinate phase to permit withdrawal of a particle-free stream may be employed. From the top of column 30 a second raffinate stream which contains raffinate product of high purity is removed through line 36.

The silica gel, as it passes from the primary saturate enriching zone to the aromatic enriching zone, carries an adsorbate phase which is substantially in equilibrium with the naphtha charge that enters through line 31. In order to effect further enrichment of the adsorbate, aromatic reflux is introduced into the lower part of the aromatic enriching zone through line 37. This functions in a manner analogous to reflux in distillation, thus causing further purification as the adsorbent particles pass toward the bottom of the aromatic enriching zone.

At the junction of the aromatic enriching zone and the first desorption zone the descending silica gel passes through another conical baffle 38 or equivalent means serving again to cause disengagement of adsorbent particles from the liquid. The space between baffle 38 and the wall of the column provides a zone from which particle-free liquid can be withdrawn through line 39 from the upper desorption zone.

Into the lower part of column 30 a stream of pentane is continuously introduced from a recycle tank 40 via line 41. The pentane is caused to flow upwardly through the second desorption zone and then through the first desorption zone, in each of which displacement of extract from the adsorbent takes place. A solution of aromatic extract in excess pentane is withdrawn from the space adjacent baffle 38 through line 39 and passes to distillation zone 42. From the latter pentane is distilled overhead through line 43, whence it returns by means of line 44 to recycle tank 40. The aromatic extract is obtained from the bottom of distillation zone 42. A portion of it is returned through pump 45 and lines 46 and 37 to the lower part of the aromatic enriching zone as reflux. The remainder is removed from the system through line 47 as one product of the process.

In order to prevent substantial flow of pentane upwardly through baffle 38 into the aromatic enriching zone it is preferred to regulate the rate of introduction of reflux through line 37, relative to other flow rates to and from the column, in such manner that a minor amount of the reflux will tend to flow downwardly through baffle 38 and prevent any upflow through the baffle. Any aromatic reflux which enters the top of the first desorption zone in this manner will be removed therefrom through line 39 along with the pentane and desorbed aromatics.

The countercurrent treatment of silica gel particles with pentane in the first desorption zone effects only a partial displacement of aromatic extract from adsorbed phase to liquid phase. Accordingly, the particles approaching the second desorption zone are partially reconditioned for re-use but are not sufficiently reconditioned to be capable of producing raffinate product of high purity. At the junction of the first and second desorption zones a portion of the silica gel, in such partially reconditioned state, is removed from the column and is returned as indicated by dotted line 48 to the adsorption section wherein it is re-introduced in the vicinity of baffle 34. Any way of removing the silica gel particles from the bottom of the first desorption zone without excessive removal of the associated liquid phase may be employed for this purpose. One manner of removing the particles comprises providing means within the column for settlement of a portion of the falling or showering particles into a more or less compact mass which is then transported in a suitable manner back to the adsorption section for re-use. As illustrated in Fig. 2 this may be done by means of a funnel-shaped trough 49 located within the column and into which a portion of the particles can fall and become compacted. An outlet line 50, connected to the bottom of trough 49, has a fluid inlet pipe 51 of smaller diameter terminating inside of it for admitting a transporting fluid adapted to carry the silica gel particles in the form of a dispersion. As such transporting medium a portion of the low purity raffinate stream which issues from the upper part of the primary saturate enriching zone through line 35 conveniently may be used. For this purpose a portion of the raffinate stream is diverted through line 52 and pump 53 and is then injected through line 51 into the adsorbent outlet line 50. The injected stream serves to disperse the compacted adsorbent which has entered line 50 from trough 49 and carry the dispersed particles back to the top of the primary saturate enriching zone as indicated by dotted line 48. The rate of circulation of adsorbent may be controlled by the rate of injection of the transporting fluid. Too high a rate of injection of the latter should be avoided so as to insure the presence of a mass of compacted adsorbent in trough 49 at all times; otherwise excessive contamination of the dispersion by liquid withdrawn from the first desorption zone may occur.

The remaining portion of silica gel which is not withdrawn through trough 49 continues to fall downwardly through the second desorption zone and is therein more fully regenerated or reconditioned by contact with the fresh pentane admitted through line 41. Upon reaching the narrowed portion 54 at the base of column 30 the reconditioned silica gel likewise settles into a compact mass which is continuously withdrawn from the base of the column and returned as indicated by dotted line 55 to the top for re-use. Transport of adsorbent from this point may be carried out in a manner similar to that employed for the partially reconditioned adsorbent. Thus, transport line 56 leading from the bottom of the column may be associated with an injection line 57 terminating within it for introducing transporting liquid. In this case a portion of the high purity raffinate stream leaving the top of column 30 through line 36 conveniently may be used by being diverted through line 58 and pump 59 and then injected by means of pipe 57 into transport line 56. Control of the rate of circulation may be accomplished in the manner previously mentioned.

The portion of low purity raffinate stream from line 35 which is not utilized as transporting medium passes through line 60 to distillation zone 61 for removal of the pentane contained in it. The recovered pentane flows overhead through line 62 and then returns by means of lines 63, and 44 to recycle tank 40. Low purity saturate product is withdrawn from the bottom of distillation zone 61 through line 62 as another product of the process.

The portion of high purity raffinate stream from the top of column 30 which is not employed as transporting medium flows through line 64 into distillation zone 65. Pentane distilled overhead is returned by means of lines 66, 63 and 44 to recycle tank 40. Saturate product of high purity is removed through line 67 as the other product of the process.

In practicing the present invention for separating liquid organic mixtures generally, a large variety of materials are available for use as the desorbing agent. These may be classified broadly as liquid organic solvents, that is, organic liquids in which the charge components are soluble or at least are soluble to such extent that there will be complete miscibility between charge components and desorbing agent at the concentrations prevailing in the process. The desorbing agent should have a boiling point or boiling range sufficiently different from that of the charge constituents to be readily separable therefrom by distillation. Preferably a desorbing agent of relatively low viscosity should be selected so that its diffusion rate during desorption is not excessive.

A further characteristic of the desorbing agent to be taken into account in operating a continuous process in which the adsorbent is recycled directly back to the adsorption step without the contained desorbing agent being first removed is its adsorbability. If the desorbent is very strongly adsorbable relative to the charge components, it will not be displaceable during the adsorption step and will tend to deactivate the adsorbent. Further, a strong desorbing agent is readily capable of displacing charge constituents from the used adsorbent, so that little advantage would be gained in withdrawing and recycling partially reconditioned adsorbent in the manner of the present invention. In practicing according to this invention, therefore, a solvent should be selected which has an adsorbability not in excess of that of the extract component of the charge. Preferably, its adsorbability should be less than that of the extract component. The lower the adsorbability of the solvent to be used, the greater are the advantages in operating according to the present process as compared to the previously proposed methods of operation.

One way of determining whether a solvent to be used as desorbing agent has suitable adsorbability characteristics is by means of its adsorption index. This concept of adsorption index as a means of defining adsorptive properties of compounds has been described in Hirschler et al. Patent No. 2,441,572 in connection with another type of adsorption process utilizing a fixed adsorbent bed. For the present purpose the adsorption index of a compound may be defined as the apparent number of cubic centimeters of the compound adsorbed by one kilogram of the adsorbent when the latter is in equilibrium with a solution consisting of 0.2% of such compound and 99.8% of isooctane. (For a detailed discussion of the determination of adsorption index reference should be made to the above-mentioned patent to Hirschler et al.) The adsorption index may thus be considered as the amount of the compound adsorbed from a standard liquid at a standard concentration and therefore a measure of the affinity of the particular adsorbent used for the compound. A low adsorption index indicates a weakly adsorbable compound while a high adsorption index indicates one that is strongly adsorbable. The adsorption index for a given compound will vary of course with different types of adsorbents and in fact will vary even with different lots of the same type of adsorbent where the lots have different inherent activities. With any given adsorbent, however, the adsorption index for a particular compound will be fixed. Isooctane has been arbitrarily chosen as the standard liquid to use in determining adsorption index for the present purpose, but as a general rule other saturate hydrocarbons may be substituted for isooctane without substantially affecting the values obtained.

By way of more specifically illustrating the selection of a material to be used as desorbing agent, reference may be had to the following table which shows the adsorption index of various organic compounds with silica gel as the adsorbent:

TABLE

*Adsorption indices of various organic solvents on silica gel*

| Compound | Adsorption Index |
|---|---|
| saturate hydrocarbons | about 0 |
| cyclohexene | 3.3 |
| trichloroethylene | 5.8 |
| 3-chloropentane | 8.2 |
| m-chlorobenzotrifluoride | 8.6 |
| chloroform | 12 |
| o-dichlorbenzene | 15 |
| chlorbenzene | 19 |
| methylene chloride | 21 |
| benzene | 24 |
| n-propylbromide | 26 |
| s-tetrachlorethane | 28 |
| brombenzene | 30 |
| tert-butylchloride | 31 |
| toluene | 31 |
| ethylene dichloride | 38 |
| iso-amyl chloride | 50 |
| benzotrichloride | 54 |
| 1,2,3-trichloropropane | 55 |
| benzyl chloride | 64 |
| benzal chloride | 90 |
| 1,4-dichlorobutane | 91 |
| nitropropane | 101 |
| benzyl mercaptan | 136 |
| dioxane | 145 |
| nitrobenzene | 162 |
| m-nitrobenzotrifluoride | 181 |
| methyl salicylate | 189 |
| benzaldehyde | 190 |
| ethyl acetate | 195 |
| benzyl ether | 198 |
| pyridine | 204 |
| diisobutylketone | 212 |
| diisopropyl ether | 212 |
| m-aminobenzotrifluoride | 228 |
| cyclohexanol | 252 |
| sec-butyl alcohol | 260 |
| ethyl alcohol | 260 |
| 2-methyl-2,4-pentanediol | 279 |
| n-butyl amine | 283 |
| morpholine | 286 |

Assuming that a mixture of toluene with one or more saturate hydrocarbons is to be separated by the present process, it can be determined from the table that the desorbing agent selected should have an adsorption index not greater than 31 (the adsorption index of toluene) and preferably should be considerably below 31. The advantages of operating according to the invention will be best realized for this separation if a material of very low adsorption index, such as a saturate hydrocarbon (e. g. pentane, isopentane, cyclopentane, hexanes, heptanes, etc., or mixtures of such hydrocarbons), is to be used as the desorbing agent; for the present process will effect a considerable reduction in the quantity of such desorbent required for processing a given amount of charge material.

Again, assuming that a mixture of benzal chloride and benzotrichloride is to be separated, a material should be selected as desorbent which has an adsorption index not greater than 90 (the adsorption index of benzal chloride) and preferably considerably less than this value. Numerous such solvents may be determined from the accompanying table.

When the extract portion of a charge material to be treated in the present process is composed of a plurality of compounds which may differ somewhat in adsorbability, as when the charge is a naphtha fraction containing a plurality of aromatics, the maximum adsorption index for the desorbing agent to be selected may be calculated by using an average adsorption index value for the extract constituents. As a general rule, however, such calculation will be unnecessary, as a desorbing agent having a considerably lower than maximum adsorbability will be selected as a matter of course.

Numerous modifications may be made within the purview of the invention and will be apparent to those skilled in the art. For example, instead of using a single column or two columns to practice the process, three or more columns can be employed if desired, for instance, by utilizing a separate column for each of the zones enumerated in connection with Fig. 2. Also, if desired, a desorbing agent which boils above rather than below the boiling range of the charge can be used.

Having described my invention, what I claim and desire to protect by Letters Patent is:

1. In a continuous process for separating a mixture of organic compounds by selective adsorption wherein a liquid charge is treated with an adsorbent to selectively adsorb a more adsorbable charge component and the adsorbent is then treated with a liquid desorbing agent to displace such component and recondition the adsorbent for re-use, the steps which comprise countercurrently treating the liquid charge with the adsorbent in an adsorption zone, countercurrently treating the used adsorbent with liquid desorbing agent having an adsorbability not greater than that of the more adsorbable charge component in a desorption zone, withdrawing a portion of the adsorbent in partially reconditioned form intermediate the ends of the desorption zone and introducing it into the adsorption zone at a locus downstream, with respect to the direction of charge flow, from the locus of charge introduction, withdrawing more fully reconditioned adsorbent adjacent the end of the desorption zone remote from its point of introduction thereto and introducing it into the adsorption zone at a still farther downstream locus with respect to the direction of charge flow, withdrawing from the adsorption zone adjacent the locus of introduction of partially reconditioned adsorbent a stream containing raffinate product of relatively low purity and withdrawing from the adsorption zone adjacent the locus of introduction of more fully reconditioned adsorbent a stream containing raffinate product of relatively high purity.

2. Process according to claim 1 wherein the charge mixture is composed of hydrocarbons having different degrees of saturation.

3. Process according to claim 2 wherein the adsorbent is silica gel.

4. Process according to claim 3 wherein the desorbing agent has an adsorption index less than that of the more adsorbable charge component.

5. In a continuous process for separating a charge mixture composed of saturate and unsaturate hydrocarbons by selective adsorption wherein such charge is treated in liquid phase with an adsorbent to selectively adsorb unsaturated hydrocarbon and the adsorbent is then treated with a liquid desorbing agent to displace unsaturate hydrocarbon and recondition the adsorbent for re-use, the steps which comprise countercurrently treating the liquid charge with the adsorbent in an adsorption zone, countercurrently treating the used adsorbent with liquid desorbing agent having an adsorbability less than that of the unsaturate hydrocarbon component in a desorption zone, withdrawing a portion of the adsorbent in partially reconditioned form intermediate the ends of the desorption zone and introducing it into the adsorption zone at a locus downstream, with respect to the direction of charge flow, from the locus of charge introduction, withdrawing more fully reconditioned adsorbent adjacent the end of the desorption zone remote from its point of introduction thereto and introducing it into the adsorption zone at a still farther downstream locus with respect to the direction of charge flow, withdrawing from the adsorption zone adjacent the locus of introduction of partially reconditioned adsorbent a raffinate stream containing saturate product of relatively low purity and withdrawing from the adsorption zone adjacent the locus of introduction of more fully reconditioned adsorbent a raffinate stream containing saturate product of relatively high purity.

6. Process according to claim 5 wherein the desorbing agent is a saturate hydrocarbon liquid which boils outside of the boiling range of the charge.

7. Process according to claim 6 wherein the adsorbent is silica gel.

8. Process according to claim 5 wherein the adsorbent is silica gel.

9. In a continuous process for separating a charge mixture composed of aromatic and saturate hydrocarbons by selective adsorption wherein such charge is treated in liquid phase with an adsorbent to selectively adsorb aromatic hydrocarbon and the adsorbent is then treated with a liquid desorbing agent to displace aromatic hydrocarbon and recondition the adsorbent for re-use, the steps which comprise countercurrently treating the liquid charge with the adsorbent in an adsorption zone, countercurrently treating the used adsorbent with liquid desorbing agent having an adsorbability less than that of the aromatic hydrocarbon component in a desorption zone, withdrawing a portion of the adsorbent in partially reconditioned form intermediate the ends of the desorption zone and introducing it into the adsorption zone at a locus downstream with respect to the direction of charge flow, from the locus of charge introduction, withdrawing more fully reconditioned adsorbent from the end of the desorption zone remote from its point of introduction thereto and introducing it into the adsorption zone at a still farther downstream locus with respect to the direction of charge flow, withdrawing from the adsorption zone adjacent the locus of introduction of partially reconditioned adsorbent a raffinate stream containing saturate product of relatively low purity and withdrawing from the adsorption zone adjacent the locus of introduction of more fully reconditioned adsorbent a raffinate stream containing saturate product of relatively high purity.

10. Process according to claim 9 wherein the desorbing agent is a saturate hydrocarbon liquid which boils outside of the boiling range of the charge.

11. Process according to claim 10 wherein the adsorbent is silica gel.

12. Process according to claim 9 wherein the adsorbent is silica gel.

13. Process for separating aromatic from saturate hydrocarbons by adsorption which comprises feeding a liquid charge composed of such hydrocarbons into an adsorption zone and therein flowing it countercurrent to an adsorbent selective for aromatic hydrocarbons, passing the used adsorbent, carrying adsorbate rich in aromatic hydrocarbon, into a first desorption zone and therein treating it countercurrently with the hereinafter specified liquid stream to effect partial regeneration by displacement of aromatic hydrocarbon, passing a portion of the partially regenerated adsorbent into a second desorption zone and therein treating it countercurrently with a saturate hydrocarbon liquid desorbent which boils outside of the boiling range of the charge to more fully regenerate the adsorbent, flowing the resulting mixture of desorbent and aromatic hydrocarbon from the second desorption zone into the first desorption zone as the said specified liquid stream, withdrawing from said first desorption zone a mixture of desorbent and aromatic hydrocarbon, returning the more fully regenerated adsorbent from the second desorption zone to said adsorption zone and introducing it therein at a locus downstream with respect to the direction of charge flow from the locus of charge introduction, returning the remaining portion of said partially regenerated adsorbent from the first desorption zone to the adsorption zone and introducing it therein between the loci of introduction of more fully regenerated adsorbent and of charge, withdrawing a raffinate stream containing charge saturate of low purity from the adsorption zone adjacent the locus of introduction of partially regenerated adsorbent, withdrawing a raffinate stream containing charge saturate of high purity from the adsorption zone adjacent the locus of introduction of more fully regenerated adsorbent, and separately distilling said mixture of desorbent and aromatic hydrocarbon, said stream containing charge saturate of low purity and said stream containing charge saturate of high purity to recover the desorbent.

14. Process according to claim 13 wherein the adsorbent is silica gel.

JAMES I. HARPER.

References Cited in the file of this patent

UNITED STATES PATENTS

| Number | Name | Date |
|---|---|---|
| 2,299,830 | Legatski et al. | Oct. 27, 1942 |
| 2,398,101 | Lipkin | Apr. 9, 1946 |
| 2,425,535 | Hibshman | Aug. 12, 1947 |
| 2,429,161 | Hudson | Oct. 14, 1947 |
| 2,441,572 | Hirschler et al. | May 18, 1948 |
| 2,448,489 | Hirschler | Aug. 31, 1948 |
| 2,449,402 | Lipkin et al. | Sept. 14, 1948 |
| 2,464,311 | Hiatt et al. | Mar. 15, 1949 |
| 2,470,339 | Claussen et al. | May 17, 1949 |